United States Patent
Sakurada et al.

(10) Patent No.: US 10,144,091 B2
(45) Date of Patent: Dec. 4, 2018

(54) LASER WELDED SHAPED STEEL

(75) Inventors: Yasuhiro Sakurada, Osaka (JP); Takefumi Nakako, Osaka (JP); Hiroshi Asada, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 508 days.

(21) Appl. No.: 14/416,796

(22) PCT Filed: Jul. 26, 2012

(86) PCT No.: PCT/JP2012/068951
§ 371 (c)(1),
(2), (4) Date: Mar. 11, 2015

(87) PCT Pub. No.: WO2014/016935
PCT Pub. Date: Jan. 30, 2014

(65) Prior Publication Data
US 2015/0273630 A1    Oct. 1, 2015

(51) Int. Cl.
*B23K 26/24*     (2014.01)
*B23K 26/32*     (2014.01)
*B23K 26/242*    (2014.01)
*B23K 103/04*    (2006.01)
*B23K 103/00*    (2006.01)

(52) U.S. Cl.
CPC .......... *B23K 26/242* (2015.10); *B23K 26/32* (2013.01); *B23K 2203/04* (2013.01); *B23K 2203/50* (2015.10); *Y10T 403/479* (2015.01)

(58) Field of Classification Search
CPC ...... B23K 26/20; B23K 26/206; B23K 26/24; B23K 26/32
See application file for complete search history.

(56) References Cited

U.S. PATENT DOCUMENTS 4,634,832 A * 1/1987 Martyr ............... B23K 26/0643
                                                    219/121.63
4,866,242 A * 9/1989 Martyr ................ B23K 26/123
                                                    219/121.64

FOREIGN PATENT DOCUMENTS

| JP | 61-293691 A   | 12/1985 |
| JP | 4-270084 A    | 9/1992  |
| JP | 2000 061673 A | 2/2000  |

(Continued)

OTHER PUBLICATIONS

Communication cited in the counterpart Taiwanese application No. 101126966 dated Aug. 2, 2016, 4 pages.

(Continued)

*Primary Examiner* — Michael P Ferguson
(74) *Attorney, Agent, or Firm* — Rothwell, Figg, Ernst & Manbeck, P.C.

(57) ABSTRACT

A welded portion shape of a cross-section perpendicular to the shaped steel longitudinal direction is set to satisfy $a>0$ mm, $b>0$ mm, $c \geq 0.14$ Tw, $d \geq 0$ mm, $e \geq 0$ mm, $a+d \leq 2$ mm and $b+e \leq 2$ mm; where a is a front melting width of the web material (on the laser beam irradiation side), b is a rear melting width of the web material (on the laser beam non-irradiation side), c is a maximum weld penetration depth, in a plate pressure direction, into the flange material, d is a front melting width of the flange material (on the laser beam irradiation side), e is a rear melting width of the flange material (on the laser beam non-irradiation side), and Tw is the plate thickness of the web material.

4 Claims, 2 Drawing Sheets

(56) References Cited

FOREIGN PATENT DOCUMENTS

| JP | 2007-307591 A | 11/2007 |
| JP | 2009-119485 A | 6/2009 |
| JP | 2011-36883 A | 2/2011 |

OTHER PUBLICATIONS

Supplemental European Search Report cited in corresponding European Application No. 12881781.4 dated May 27, 2016, 7 pages.

* cited by examiner

LASER WELDED SHAPED STEEL

CROSS REFERENCE TO RELATED APPLICATIONS

This application is a 35 U.S.C. § 371 National Phase Entry Application from PCT/JP2012/068951, filed on Jul. 26, 2012, and designating the United States, which claims priority under 35 U.S.C. § 119 to Japanese Patent Application No. 2011-016954 filed on Jan. 28, 2011, which is incorporated herein by reference in its entirety.

TECHNICAL FIELD

The present invention relates to welded shaped steel, in which a T-shaped welded joint is formed by laser welding, using laser beam as a heat source.

BACKGROUND ART

Laser welding methods that involve irradiating laser beam onto a T-shaped joint between a flange material and a web material, have been studied as methods for producing shaped steel such as T-shaped steel or H-shaped steel, which is used for instance in beams that make up building frames of buildings.

As illustrated in Patent literature 1, for instance, two metal plates are butted perpendicularly to each other, and two laser beams are irradiated simultaneously, along the butting section, onto opposing positions, from both the front and rear faces of the butting metal plates.

In such a method, laser beam is irradiated onto the butting section from the directions of both sides of the web material, which is not necessarily efficient in terms of enhancing productivity.

Therefore, the applicants proposed a method that involves irradiating laser onto the butting section only from the direction of one face of the web material. See, for instance, Patent literature 2.

To produce a building member in which a T-shaped welded joint is formed by pressing of edge section of a second metal plate perpendicularly to a first metal plate, this method involves relying on laser welding through irradiation of laser beam, as the welding method, with laser beam being irradiated at an inclination angle of 30 degrees or less with respect to the first metal plate, in such a manner that the second metal plate melts, over the entire thickness thereof, at the end section at which the second metal plate is pressed.

Patent literature 1: Japanese Patent Application Publication No. 2005-21912

Patent literature 2: Japanese Patent Application Publication No. 2007-307591

DISCLOSURE OF THE INVENTION

In the welding method proposed in Patent literature 2, laser beam is irradiated in such a manner that the web material melts over the entire thickness thereof at the edge section of the web material, on the pressed side. The melting region can accordingly be made narrow and deep. As a result, this allows not only weld-joining with good shape precision, but allows also a damaged region, at which a plating layer evaporates, to be made as narrow as possible, when the flange material and the web material (steel plate to be welded) are plated steel plates. It becomes possible as a result to reduce the coating amount of refinish coating after welding. Since the melting region can be made thus deep, profiles of required welding strength can be produced in a simple manner, even with welding from just one side.

In the welding method of Patent literature 2, however, the portion to be welded melts, upon being irradiated with laser beam, over the entire thickness of the plate. In some instances, therefore, the shape conditions of the melted section can vary and the desired joint strength may fail to be achieved, depending on differences in the incidence angle of laser beam with respect to the flange material, the aim position of laser beam with respect to the edge section of the web material, and the energy of the laser beam itself. When the shape conditions of the melted section vary, the corrosion resistance of the produced welded shaped steel may in some instances be impaired, due to changes in the evaporation conditions of the plated layer, in cases where a plated steel plate, in particular a galvanized steel plate, is used as the material.

It is thus an object of the present invention, which has been devised to solve such problems, to provide laser-welded shaped steel, comprising a T-shaped joint, and in which desired joint strength and desired corrosion resistance are secured, by prescribing a suitable shape of melted sections that are formed in the laser-welded shaped steel.

In order to attain the above goal, the laser-welded shaped steel of the present invention is shaped steel in which a T-shaped joint, formed by pressing of an edge section of a web material perpendicularly against a flange material, is fusion-joined on the basis of one-pass irradiation of laser beam that is irradiated from a face on one side of the web material, wherein both the flange material and the web material comprise a steel plate, and a welded portion shape of a cross-section along the longitudinal direction of the shaped steel satisfies $a>0$, $b>0$, $c≥0.14\,Tw$, $d≥0$ and $e≥0$.

When both the flange material and the web material comprise a galvanized steel plate, there hold preferably $a>0$, $b>0$, $c≥0.14\,Tw$, $d≥0$, $e≥0$, $a+d≤2$ and $b+e≤2$.

Herein, $a$ is a front melting width of the web material (on the laser beam irradiation side), $b$ is a rear melting width of the web material (on the laser beam non-irradiation side), $c$ is a maximum weld penetration depth, in the plate thickness direction, into the flange material, $d$ is a front melting width of the flange material (on the laser beam irradiation side), $e$ is a rear melting width of the flange material (on the laser beam non-irradiation side), and $Tw$ is the plate thickness of the web material, with all the units thereof being mm.

Preferably, a ratio $Sf/Su$ satisfies $Sf/Su<0.75$, $Sf$ being a surface area of weld penetration into the flange material and $Su$ being a surface area of weld penetration into the web material, of the welded portion.

The following approximations $Sf=(d+Tw+e)\times c/2$ and $Su=(a+b)\times Tw/2$ apply herein.

In the laser-welded shaped steel according to the present invention, a T-shaped joint, formed by pressing of an edge section of a web material perpendicularly against a flange material, is fusion-joined on the basis of one-pass irradiation of laser beam from one side onto the joint, such that the melted welded portion that is formed at the joint has a prescribed shape.

As a result, the laser-welded shaped steel provided by the present invention has stable joint strength, and exhibits no drop in welded portion corrosion resistance even when, in particular, the laser-welded shaped steel is welded shaped steel in which a galvanized steel plate is used. Therefore, it becomes possible to produce, at a low cost, welded shaped steel of high strength and high corrosion resistance.

BEST MODE FOR CARRYING OUT THE INVENTION

Figure 1:
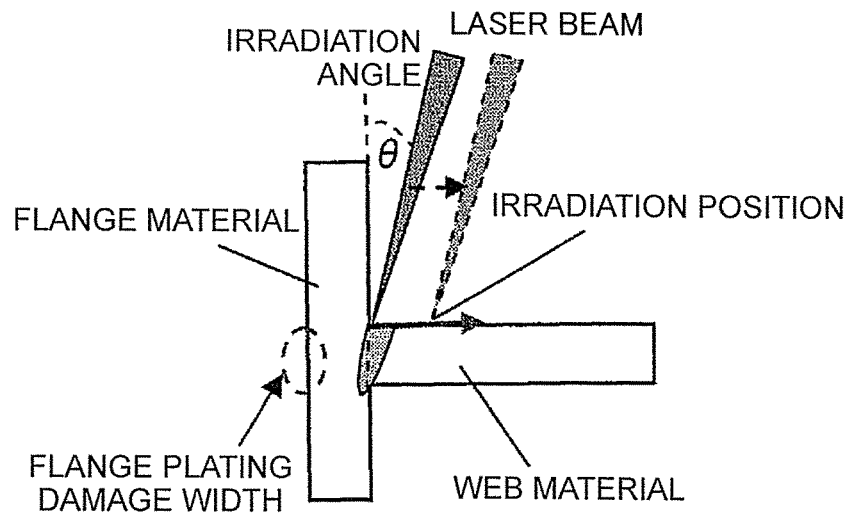
FIG. 1 is a diagram for explaining a method for laser welding a T-shaped joint through one-pass irradiation from one side.

Upon welding of a T-shaped joint formed by pressing of an edge section of a web material perpendicularly against a flange material on the basis of one-pass laser beam irradiation of the T-shaped joint from one side (front or rear side of the web material), a desired joint strength fails to be obtained unless the irradiation angle θ of laser beam with respect to the flange material and the irradiation position of laser beam with respect to edge section of the web material, illustrated in FIG. 1, are set properly. In a case where a plated steel plate is used as the material, the plating layer of the flange material at the face that abuts the web material may be damaged unless the irradiation angle θ and the irradiation position are set properly.

For instance, when the irradiation angle θ of the laser beam is reduced, there increase the flange front melting width d and the flange rear melting width e at positions above and below the intersection point (abutting position) of the web material and the flange material, illustrated in FIG. 2, and impairment of the corrosion resistance of the welded portion becomes a concern.

When by contrast the irradiation angle θ is increased, the flange melting widths d and e decrease, but the weld penetration at the web end face decreases as well. Accordingly, an unmelted section is prone to occur, and it is no longer possible to secure sufficient strength. When the irradiation angle θ is increased, moreover, the weld penetration depth c into the flange material increases as well. As a result, thermal deformation increases in a case where the flange material is thin, and the width of the plating damage on the surface facing the web material increases, in the case of a plated steel plate.

Figure 2:
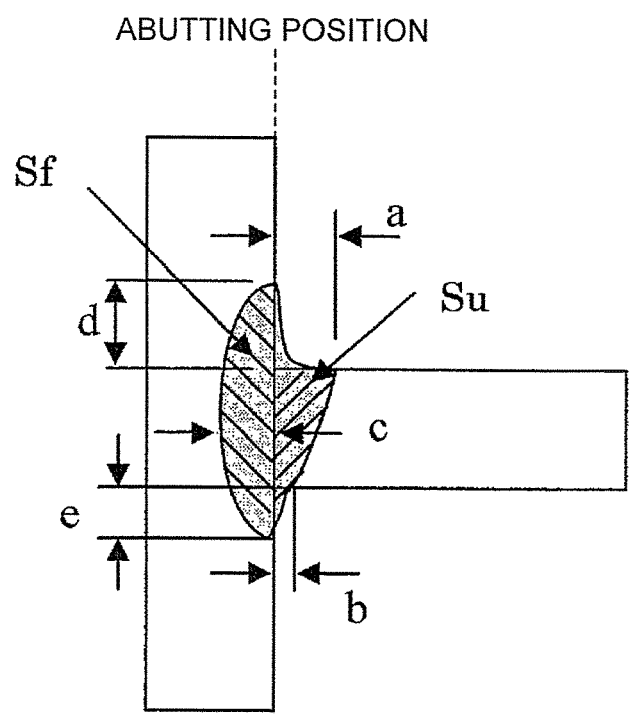
FIG. 2 is a diagram for explaining a melted welded portion shape of a T-shaped joint in a cross-section along the longitudinal direction of shaped steel.
Figure 3:
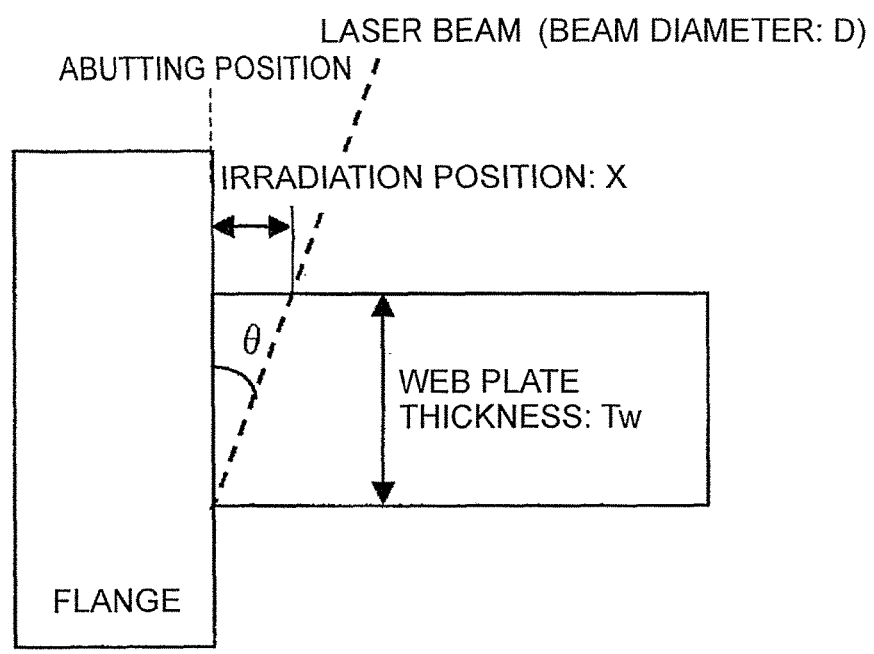
FIG. 3 is a diagram for explaining a relationship between a laser beam irradiation angle θ and an irradiation position with respect to an edge section of the web material, during laser welding of a T-shaped joint through one-pass irradiation from one side.

Accordingly, the inventors found optimal sizes of the various sites, illustrated in FIG. 2, that result in desired characteristics, by finely adjusting the irradiation angle θ of laser beam with respect to the flange material and the irradiation position of laser beam with respect to the edge section of the web material.

The detailed particulars will be explained below.

Firstly, a preliminary experiment (FIG. 1) was performed that involved modifying, in various ways, the irradiation angle θ of laser beam and irradiation position, in order to assess the influence exerted on the flange material by the irradiation angle θ and the distance from the abutting position of the web material and the flange material up to the irradiation position of the laser beam. The irradiation position is represented by the coordinates, with respect to the abutting position as the origin, of the irradiation position on the laser beam irradiation surface of the web material, in the direction of moving away from the abutting position.

Herein, T-shaped shaped steel was obtained by laser welding under the conditions given in The above 1, using a hot-dipped steel plate, cut to a width of 200 mm and a length of 2000 mm, in which a Zn-6% Al-3% Mg alloy plating layer was deposited, to a deposition amount of 90 g/m² per side, on a steel plate having a plate thickness of 2.3 mm and a tensile strength of 400 N/mm². Herein Ar was used as a shield gas, and as a side gas that was blown onto the laser beam irradiation point from an oblique transversal direction.

TABLE 1

| Welding conditions | |
| --- | --- |
| Laser welder | Fiber laser welder |
| Beam spot diameter (mm) | φ0.6 |
| Focal distance (mm) | 600 |
| Output (kW) | 4.0 |
| Welding speed (m/min) | 5.0 |
| Shield gas (l/min) | Ar/20 (side gas) |
| Irradiation angle θ (°) | 5 to 20 |
| Irradiation position (mm) | 0 to +1.0 |

Thereafter, the sizes of the sites illustrated in FIG. 2 were measured on the basis of cross-section observation of the welded portion of the obtained T-shaped laser-welded shaped steel, and the joint strength of the welded portions was likewise measured. The welds were visually observed from the non-abutting surface side of the web material of the flange material.

A tensile test according to JIS G 3353 was carried out. Joint strength was determined to be good if the tensile strength at the load of breakage was 400 N/mm² or higher, in case of breakage of the base material of the web. Joint strength was determined to be good if the value resulting from dividing the breaking load by the actual cross-sectional area of the web was 400 N/mm² or higher, in the case of breakage of the welded portion. In the observation from the non-abutting surface side of the flange material, instances of observable damage due to re-melting of plating were deemed as instances of damage, and the corresponding damage width was measured.

The results are given Tables 2 to 12.

In Tables 2 to 12, underlined numerical values denote instances of insufficient strength in the tensile test. The units of the numerical values in the tables are mm.

TABLE 2

Welded portion shape: a

| | Irradiation position (mm) | | | | | |
| --- | --- | --- | --- | --- | --- | --- |
| Irradiation angle (°) | 0 | 0.2 | 0.4 | 0.6 | 0.8 | 1.0 |
| 5 | 0.73 | 0.76 | 1.18 | <u>1.45</u> | | |
| 10 | 0.95 | 0.73 | 0.87 | 1.35 | <u>1.57</u> | |
| 15 | <u>0.74</u> | 0.61 | 1.09 | 1.21 | <u>1.67</u> | |
| 20 | <u>0.80</u> | <u>0.70</u> | 0.75 | 1.00 | 1.60 | <u>1.77</u> |

TABLE 3

Welded portion shape: b

| | Irradiation position (mm) | | | | | |
| --- | --- | --- | --- | --- | --- | --- |
| Irradiation angle (°) | 0 | 0.2 | 0.4 | 0.6 | 0.8 | 1.0 |
| 5 | 0.45 | 0.45 | 0.78 | <u>1.28</u> | | |
| 10 | 0.58 | 0.64 | 0.55 | 1.04 | <u>1.18</u> | |

TABLE 3-continued

Welded portion shape: b

| Irradiation angle (°) | Irradiation position (mm) | | | | | |
|---|---|---|---|---|---|---|
| | 0 | 0.2 | 0.4 | 0.6 | 0.8 | 1.0 |
| 15 | <u>0</u> | 0.54 | 0.74 | 0.82 | <u>0.85</u> | |
| 20 | <u>0</u> | <u>0</u> | 0.37 | 0.43 | 0.91 | <u>0.81</u> |

TABLE 4

Welded portion shape: c

| Irradiation angle (°) | Irradiation position (mm) | | | | | |
|---|---|---|---|---|---|---|
| | 0 | 0.2 | 0.4 | 0.6 | 0.8 | 1.0 |
| 5 | 0.42 | 0.42 | 0.46 | <u>0.23</u> | | |
| 10 | 0.59 | 0.65 | 0.60 | 0.43 | <u>0.21</u> | |
| 15 | <u>0.91</u> | 0.86 | 0.63 | 0.51 | <u>0.20</u> | |
| 20 | <u>0.95</u> | <u>1.00</u> | 1.02 | 0.86 | 0.33 | <u>0.28</u> |

TABLE 5

Welded portion shape: d

| Irradiation angle (°) | Irradiation position (mm) | | | | | |
|---|---|---|---|---|---|---|
| | 0 | 0.2 | 0.4 | 0.6 | 0.8 | 1.0 |
| 5 | 1.63 | 0.52 | 0.20 | <u>0</u> | | |
| 10 | 1.82 | 1.19 | 0.83 | 0.25 | <u>0</u> | |
| 15 | <u>1.50</u> | 1.01 | 0.31 | 0 | <u>0</u> | |
| 20 | <u>1.55</u> | <u>1.20</u> | 0.52 | 0.31 | 0 | <u>0</u> |

TABLE 6

Welded portion shape: e

| Irradiation angle (°) | Irradiation position (mm) | | | | | |
|---|---|---|---|---|---|---|
| | 0 | 0.2 | 0.4 | 0.6 | 0.8 | 1.0 |
| 5 | 0.84 | 1.29 | 0.35 | <u>0.12</u> | | |
| 10 | 0.33 | 0.53 | 0.85 | 0 | <u>0</u> | |
| 15 | <u>0</u> | 0.35 | 0.48 | 0.54 | <u>0</u> | |
| 20 | <u>0</u> | <u>0</u> | 0.22 | 0.25 | 0.28 | <u>0</u> |

TABLE 7

Welded portion shape: a + d

| Irradiation angle (°) | Irradiation position (mm) | | | | | |
|---|---|---|---|---|---|---|
| | 0 | 0.2 | 0.4 | 0.6 | 0.8 | 1.0 |
| 5 | 2.36 | 1.28 | 1.38 | <u>1.45</u> | | |
| 10 | 2.77 | 1.92 | 1.70 | 1.60 | <u>1.57</u> | |
| 15 | <u>2.24</u> | 1.62 | 1.40 | 1.21 | <u>1.67</u> | |
| 20 | <u>2.35</u> | <u>1.90</u> | 1.27 | 1.31 | 1.60 | <u>1.77</u> |

TABLE 8

Welded portion shape: b + e

| Irradiation angle (°) | Irradiation position (mm) | | | | | |
|---|---|---|---|---|---|---|
| | 0 | 0.2 | 0.4 | 0.6 | 0.8 | 1.0 |
| 5 | 1.29 | 1.74 | 1.13 | <u>1.40</u> | | |
| 10 | 0.91 | 1.17 | 1.40 | 1.04 | <u>1.18</u> | |
| 15 | <u>0</u> | 0.89 | 1.22 | 1.36 | <u>0.85</u> | |
| 20 | <u>0</u> | <u>0</u> | 0.59 | 0.68 | 1.19 | <u>0.81</u> |

TABLE 9

Welded portion shape: Su

| Irradiation angle (°) | Irradiation position (mm) | | | | | |
|---|---|---|---|---|---|---|
| | 0 | 0.2 | 0.4 | 0.6 | 0.8 | 1.0 |
| 5 | 1.36 | 1.39 | 2.25 | <u>3.14</u> | | |
| 10 | 1.76 | 1.58 | 1.63 | 2.75 | <u>3.16</u> | |
| 15 | <u>0.85</u> | 1.32 | 2.10 | 2.33 | <u>2.90</u> | |
| 20 | <u>0.92</u> | <u>0.81</u> | 1.29 | 1.64 | 2.89 | <u>2.97</u> |

TABLE 10

Welded portion shape: Sf

| Irradiation angle (°) | Irradiation position (mm) | | | | | |
|---|---|---|---|---|---|---|
| | 0 | 0.2 | 0.4 | 0.6 | 0.8 | 1.0 |
| 5 | 0.98 | 0.86 | 0.66 | <u>0.28</u> | | |
| 10 | 1.31 | 1.31 | 1.19 | 0.55 | <u>0.24</u> | |
| 15 | <u>1.73</u> | 1.57 | 0.97 | 0.72 | <u>0.23</u> | |
| 20 | <u>1.83</u> | <u>1.75</u> | 1.55 | 1.23 | 0.43 | <u>0.32</u> |

TABLE 11

Welded portion shape: Sf/Su

| Irradiation angle (°) | Irradiation position (mm) | | | | | |
|---|---|---|---|---|---|---|
| | 0 | 0.2 | 0.4 | 0.6 | 0.8 | 1.0 |
| 5 | 0.72 | 0.62 | 0.29 | <u>0.09</u> | | |
| 10 | 0.75 | 0.83 | 0.73 | 0.20 | <u>0.08</u> | |
| 15 | <u>2.03</u> | 1.19 | 0.46 | 0.31 | <u>0.08</u> | |
| 20 | <u>1.99</u> | <u>2.17</u> | 1.20 | 0.75 | 0.15 | <u>0.11</u> |

TABLE 12 flange damage width

| Irradiation angle (°) | Irradiation position (mm) | | | | | |
|---|---|---|---|---|---|---|
| | 0 | 0.2 | 0.4 | 0.6 | 0.8 | 1.0 |
| 5 | 1.50 | 1.47 | 0.84 | <u>0</u> | | |
| 10 | 3.30 | 2.73 | 1.74 | 0.86 | <u>0</u> | |
| 15 | <u>3.48</u> | 2.75 | 1.90 | 1.18 | <u>0</u> | |
| 20 | <u>3.50</u> | <u>3.30</u> | 3.26 | 2.50 | 0.62 | <u>0</u> |

In order to secure the welding strength in the T-shaped joint that comprises a combination of the web material and the flange material, the foregoing materials must be integrated together through melting in the vicinity of the mutual abutting surfaces of the flange material and the web material. In a case where welding is performed by one-pass laser welding from one side, specifically, a front melting width and rear melting width of the web material (front and rear beads of the flange material) must be present (a>0, b>0), and the flange must exhibit weld penetration. The results in Table 4 indicate that the weld penetration depth c into the flange must be equal to or greater than 0.33 mm. Table 4 gives test results for steel plates having a plate thickness of 2.3 mm. Accordingly, the weld penetration width c in a flange must ordinarily be equal to or greater than 0.14×Tw (mm), since c/Tw=0.33/2.3=0.14.

Laser beam is incident obliquely from the top face of the flange. Accordingly, when the incidence angle is excessively large, or when the irradiation position is too far removed from the abutting position of the flange material and the web material, strength tends to drop since there is no front melting width or rear melting width of the web material, and an unmelted section arises between the web end face and the flange. Specifically, the front and rear melting widths d and e of the flange material must satisfy d≥0 (mm) and e≥0 (mm).

If the flange material is a thin plated steel plate, the flange material exhibits substantial plating damage and undergoes thermal deformation at the face opposing the web material when the weld penetration amount in the flange material is large. Accordingly, the weld penetration amount into the flange material should not be excessively large.

The melting surface area in the vicinity of the intersection point between the web material and the flange material should be as small as possible. The sacrificial protection action at a cut end face of the galvanized steel plate is reported to extend ordinarily only to about 2.3 mm. Taking into consideration evaporation of plating around the welded portion in the laser welded portion, good corrosion resistance can then be secured, even without repair-coating of the welded portion, by keeping the melting width by laser welding up to about 2 mm. Accordingly, the melting region is best kept within 2 mm.

In a case where a galvanized steel plate is used as the material, specifically, there must hold a+d≤2 mm and b+e≤2 mm in order to suppress impairment of corrosion resistance in the vicinity of the intersection point of the web material and the flange material.

Preferably, the damage width of the flange is 2 mm or smaller, from the viewpoint of sacrificial protection of the plated steel plate. However, although in Table 7 a+d is 2 or smaller when the irradiation angle θ is 10° or 15°, if the aim position is 0.2 mm, the flange damage width in Table 12 exceeds nevertheless 2 mm, under identical conditions.

The flange damaged section is not irradiated by laser beam, and therefore, does not disappear completely through evaporation of plating; accordingly, the damage width need not necessarily be 2 mm or smaller. However, good corrosion resistance is elicited, even without application of a repair coating, through the sacrificial protective action of the galvanized steel plate. Therefore, the width of the flange damaged section is preferably set to be 2 mm or smaller, and there is prescribed Sf/Su<0.75, in order to suppress thermal deformation of the flange. Herein, Sf is the surface area of weld penetration into the flange material, and Su is the surface area of weld penetration into the web material of the welded portion. The surface area of weld penetration into the flange material denotes the surface area of a region in which the metal has melted once and that appears within the flange material, at a cross-section along the longitudinal direction of the shaped steel. The surface area of weld penetration into the web material is the surface area of a region in which the metal has melted once, and which appears within the web material, at a cross-section along the longitudinal direction of the shaped steel.

More preferably, there holds Sf/Su≥0.15, from the viewpoint of the strength of the welded portion.

The following approximations Sf=(d+Tw+e)×c/2 and Su=(a+b)×Tw/2 apply herein.

In a case where a galvanized steel plate is used as the material, there must hold a+d≤2 mm and b+e≤2 mm. Preferably, here holds also Sf/Su<0.75, as confirmed in a repetition test (CCT test) of salt spraying→drying→moistening, widely used in the art as an accelerated test for corrosion resistance evaluation. (In this case the repeat conditions that were resorted to included two-hour spraying of 5% NaCl at 35° C.→four-hour drying at 60° C. and 30% RH (relative humidity)→two-hour moistening at 50° C. and 95% RH.)

The test was performed over 200 cycles. The results revealed that in a laser welded portion of a T-shaped joint with a+d≤2 mm and b+e≤2 mm, the welded portion became covered with white rust, from an early stage, while no occurrence of red rust was observed. The plating damaged section in the heat-affected zone of the flange was also covered with white rust, but no occurrence of red rust was observed. No thermal deformation was observed, either, in the flange section.

The entire web end face must be melted efficiently in order to obtain a melted section of narrowness such as the above-described one. In order to achieve a narrow melted section, it is therefore best, with geometry in mind, to aim at an intersection point of the flange and the web, on the web rear face side, than to aim at an intersection point of the flange and the web on the web front face side, upon welding of the T-shaped joint by one-pass laser welding from one side.

The aim position X from the flange on the web front face is worked out from "X=Tw·tan θ" (where Tw: web plate thickness, θ: laser incidence angle with respect to the flange). An unmelted section arises when the aim position X is set to be equal to or greater than the laser beam radius (D/2), since the laser does not pass through the intersection point of the web front face and the flange, taking geometry into account.

In actuality, however, also the periphery of the laser beam diameter is thermally affected (through heat conduction), and thus melting occurs within a range equal to or greater than the beam diameter. The area over which melting occurs ranges from about 1.1 to 2.5 times the beam diameter, depending on the conditions. Accordingly, the upper limit value of the aim position X is "2.5×(D/2)" (Tw·tan θ<X≤2.5×(D/2)). The irradiation angle θ can be obtained from the above expression as $0 < \theta \leq \tan^{-1}((2.5 \times D/2)/Tw)$.

A welded portion of prescribed shape can be obtained by welding the T-shaped joint, through one-pass laser welding, from one side, according to the irradiation angle θ and the aim position X.

The invention claimed is:

1. A laser-welded shaped steel comprising a T-shaped joint, formed by pressing of an edge of a plate-shaped web material perpendicularly against a plate-shaped flange material, which is fusion-joined by a one-pass laser beam irradiation that is irradiated from a front side face of the web material to form a continuous one-pass weld bead along the edge of the web material with the flange material, wherein:
   both the flange material and the web material comprise a steel plate;
   the weld melts through the entire thickness of the web material and into a front side face of the flange material to form a weld penetration which extends from a laser beam irradiation side to a laser beam non-irradiation side of the flange material; and a cross-section of the weld bead perpendicular to the longitudinal direction of said shaped steel satisfies a>0, b>0, c≥0.14 Tw, d≥0, e≥0, wherein:

a is a front melting width of the web material on the laser beam irradiation side, b is a rear melting width of the web material on the laser beam non-irradiation side, c is a maximum weld penetration depth, in the plate thickness direction, into the flange material opposite the web material, d is a front melting width of the flange material on the laser beam irradiation side, e is a rear melting width of the flange material on the laser beam non-irradiation side, and Tw is the plate thickness of the web material, with all units thereof being mm, and wherein the maximum weld penetration depth into the flange material extends in a direction substantially transverse to the edge of the web material.

2. The laser-welded shaped steel according to claim 1, wherein a surface area of the weld penetration into the flange material is Sf and a surface area of the weld penetration into the web material is Su, and a ratio Sf/Su satisfies Sf/Su<0.75.

3. A laser-welded shaped steel comprising a T-shaped joint, formed by pressing of an edge of a plate-shaped web material perpendicularly against a plate-shaped flange material, which is fusion-joined by a of one-pass laser beam irradiation that is irradiated from a front side face of the web material to form a continuous one-pass weld bead along the edge of the web material with the flange material, wherein:

both the flange material and the web material comprise a galvanized steel plate;

the weld melts through the entire thickness of the web material and into a front side face of the flange material to form a weld penetration which extends from a laser beam irradiation side to a laser beam non-irradiation side of the flange material; and a cross-section of the weld bead perpendicular to the longitudinal direction of said shaped steel satisfies a>0, b>0, c≥0.14 Tw, d≥0, e≥0, a+d≤2, b+e≤2, wherein:

a is a front melting width of the web material on the laser beam irradiation side, b is a rear melting width of the web material on the laser beam non-irradiation side, c is a maximum weld penetration depth, in the plate thickness direction, into the flange material opposite the web material, d is a front melting width of the flange material on the laser beam irradiation side, e is a rear melting width of the flange material on the laser beam non-irradiation side, and Tw is the plate thickness of the web material, with all units thereof being mm, and wherein the maximum weld penetration depth into the flange material extends in a direction substantially transverse to the edge of the web material.

4. The laser-welded shaped steel according to claim 3, wherein a surface area of the weld penetration into the flange material is Sf and a surface area of the weld penetration into the web material is Su, and a ratio Sf/Su satisfies Sf/Su<0.75.

* * * * *